(12) United States Patent
Friede

(10) Patent No.: US 10,405,668 B2
(45) Date of Patent: Sep. 10, 2019

(54) SYSTEM APPARATUS AND METHOD FOR CONVERTING A REMOVABLE SEAT FROM A VEHICLE TO AN INDEPENDENT SEATING UNIT

(71) Applicant: Curtis S. Friede, Seeley Lake, MT (US)

(72) Inventor: Curtis S. Friede, Seeley Lake, MT (US)

(*) Notice: Subject to any disclaimer, the term of this patent is extended or adjusted under 35 U.S.C. 154(b) by 45 days.

(21) Appl. No.: 15/657,675

(22) Filed: Jul. 24, 2017

(65) Prior Publication Data

US 2019/0021506 A1 Jan. 24, 2019

(51) Int. Cl.
*B60N 2/24* (2006.01)
*A47C 13/00* (2006.01)
*A47C 3/029* (2006.01)
*B60N 2/015* (2006.01)
*A47C 4/02* (2006.01)

(52) U.S. Cl.
CPC .............. *A47C 13/00* (2013.01); *A47C 3/029* (2013.01); *A47C 4/02* (2013.01); *B60N 2/015* (2013.01)

(58) Field of Classification Search
CPC ........ A47C 13/00; A47C 3/029; B60N 2/015; B60N 2/32
See application file for complete search history.

(56) References Cited

U.S. PATENT DOCUMENTS

| | | | | |
|---|---|---|---|---|
| 3,999,799 A * | 12/1976 | Daswick | ............... | A47C 3/0257 297/270.3 |
| 4,447,087 A * | 5/1984 | Massonnet | ......... | A47C 1/03238 297/130 |
| 5,139,301 A * | 8/1992 | Lewis | .................. | B60N 2/3095 296/63 |
| 5,516,179 A * | 5/1996 | Tidwell | .................. | B60N 2/015 296/63 |
| 7,159,939 B2 * | 1/2007 | Brown | .................... | B60N 2/015 296/64 |
| 7,434,861 B2 * | 10/2008 | Arias | ...................... | B60N 2/005 296/63 |
| 7,597,396 B2 * | 10/2009 | Longenecker | ....... | B60N 2/2806 297/253 |
| 7,762,603 B2 * | 7/2010 | Hyde | ....................... | B60N 2/24 248/503.1 |

(Continued)

*Primary Examiner* — Shin H Kim
(74) *Attorney, Agent, or Firm* — Law Ofc of Donald D. Mondul

(57) ABSTRACT

An apparatus for adapting a seat removable from a vehicle for use as an independent seating unit. The seat is configured for installation in the vehicle using complementary first and second engaging structures included in the seat and the vehicle. The first and second engaging structures cooperate to affix the seat within the vehicle in an installed orientation. The apparatus includes: (a) a generally horizontal first member; (b) at least one generally vertical second member depending from the first member; the at least one second member maintaining the first member in spaced relation from a base upon which the seating unit rests in the installed orientation; and (c) a third engaging structure configured for cooperating with one of the complementary first and second engaging structures to affix the seat with the apparatus in the installed orientation.

10 Claims, 6 Drawing Sheets

(56) References Cited

U.S. PATENT DOCUMENTS

| | | | | |
|---|---|---|---|---|
| 7,980,616 B2* | 7/2011 | Fletcher | B60N 2/01 | |
| | | | 296/64 | |
| 9,346,373 B2* | 5/2016 | Cai | B60N 2/366 | |
| 9,463,121 B1* | 10/2016 | Maeshiro | A61G 5/08 | |
| 9,994,260 B2* | 6/2018 | Ito | B60G 3/06 | |
| 2003/0011221 A1* | 1/2003 | Yoshie | A47D 1/002 | |
| | | | 297/130 | |
| 2007/0216187 A1* | 9/2007 | Hyde | B60N 2/015 | |
| | | | 296/64 | |
| 2008/0007082 A1* | 1/2008 | Arias | B60N 2/005 | |
| | | | 296/63 | |
| 2008/0018156 A1* | 1/2008 | Hammarskjold | B60N 2/688 | |
| | | | 297/354.1 | |
| 2008/0067829 A1* | 3/2008 | Arias | B60N 2/005 | |
| | | | 296/65.03 | |
| 2011/0241391 A1* | 10/2011 | Lamparter | B60N 2/24 | |
| | | | 297/216.1 | |
| 2017/0174027 A1* | 6/2017 | Mailhot | B62D 23/005 | |

\* cited by examiner

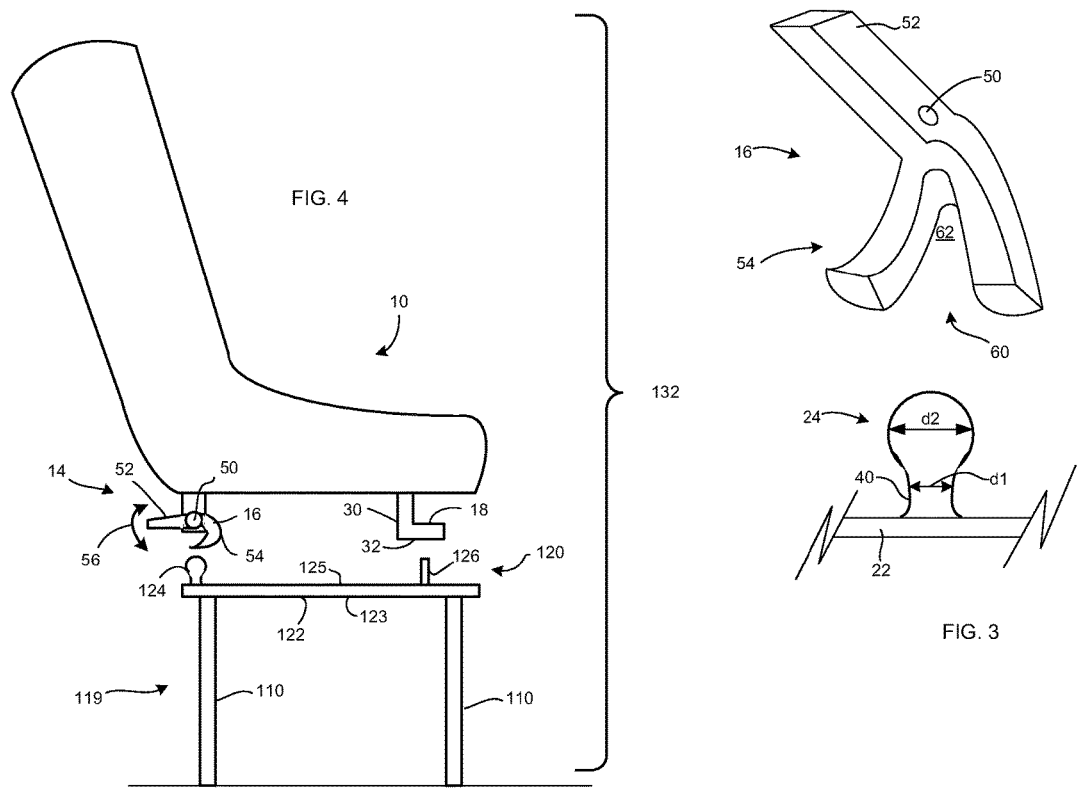

SYSTEM APPARATUS AND METHOD FOR CONVERTING A REMOVABLE SEAT FROM A VEHICLE TO AN INDEPENDENT SEATING UNIT

BACKGROUND OF THE INVENTION

The present invention is directed to providing a comfortable independent seating unit using a seat designed to be removed from a vehicle.

When one participates in an outdoor event, such as, by way of example and not by way of limitation, a campout or picnic or similar activity, there is often a paucity of comfortable seating. Participants in such an event often find themselves sitting on backless stools, small camp chairs, rocks, picnic benches, blankets or the like. It would be desirable to have a comfortable individual seating unit available to better enjoy an event.

Such events often are attended by persons driving off-road vehicles, such as side-by-side vehicles. Off-road side-by-side vehicles may be referred to by any of several terms, including but not necessarily limited to SXS, UTV (Utility Task Vehicle), ROV (Recreational Off-highway Vehicle), ad MOHUV (Multi-purpose Off-Highway Utility Vehicle). For purposes of this disclosure, the term UTV may be used synonymously with the term off-road side-by-side vehicles. Early versions of off road side-by-side vehicles were introduced initially as "work horse" vehicles generally suitable for rancher and farmer use and similar activities. As the market has developed, off-road side-by-side products have evolved to include "sport" models differing from early models by providing increased horsepower, more agile handling and other features associated with a recreational environment as compared with a work environment.

Examples of such off-road side-by-side vehicles may include, by way of example and not by way of limitation:

| Model/Trademark | Manufacturer/Trademark Owner |
|---|---|
| Polaris Razr | Polaris Industries, Inc. |
| Kawasaki Teryx | Kawasaki Motors Corp. |
| Can Am Commander | Bombardier Recreational Products, Inc |
| Arctic Cat Prowler | Arctic Cat, Inc. |
| Yamaha Rhino | Yamaha Motor Corporation |
| Honda Pioneer | American Honda Motor Company, Inc. |

At least some of the above vehicles have removable seats. The removable seats are designed for solid attachment within the vehicle but permitting easy removal. Generally, such removable seat arrangements include a first engaging structure associated with the seat and a complementary second engaging structure associated with the vehicle. The terminology indicating an element is "associated with" a component may include an element attached with a component, an element integrally formed with a component, or an element otherwise permanently affixed with a component with no design intent to separate the element from the associated component. The term "complementary", in the context of this disclosure, is intended to mean that two or more elements operate together to complete performance of a task or function.

The seats in off-road side-by-side vehicles are generally quite comfortable as they are constructed to absorb many bumps and jolts one may encounter during off-road travel. It would be advantageous to be able to provide such comfort for persons attending picnics and similar events as described above.

There is a need to ameliorate the paucity of comfortable seating at outdoor events.

The present invention provides a system, apparatus and method for employing a seat removed from an off-road side-by-side vehicle in an independent seating unit.

SUMMARY OF THE INVENTION

A system for converting a removable seat from a vehicle to an independent seating unit The removable seat has a first engaging structure associated with the seat. The vehicle has a second engaging structure associated with the vehicle. The first engaging structure cooperates with the second engaging structure to affix the seat with the vehicle. The system includes: (a) a generally rigid support structure; (b) a plurality of legs depending from a first side of the support structure; and (c) a third engaging structure oriented for receiving the first engaging structure. The third engaging structure cooperates with the seat to effect a substantially rigid affixing of the seat with a second side of the support structure opposite the first side to complete the converting.

An apparatus for adapting a seat removable from a vehicle for use as an independent seating unit. The seat is configured for installation in the vehicle using complementary first and second engaging structures respectively included in the seat and the vehicle. The first and second engaging structures cooperate to affix the seat within the vehicle in an installed orientation. The apparatus includes: (a) a generally horizontal first member; (b) at least one generally vertical second member depending from the first member; the at least one second member maintaining the first member in spaced relation from a base upon which the seating unit rests in the installed orientation; and (c) a third engaging structure configured for cooperating with one of the complementary first and second engaging structures to affix the seat with the apparatus in the installed orientation.

A method for converting a removable seat from a vehicle to an independent seating unit. The removable seat has a first engaging structure associated with the seat. The vehicle has a second engaging structure associated with the vehicle. The first engaging structure cooperates with the second engaging structure to affix the seat with the vehicle. The method includes the steps of: (a) providing a generally rigid support structure; (b) providing a plurality of legs depending from a first side of the support structure; (c) providing a third engaging structure oriented for receiving the first engaging structure; and (d) employing the third engaging structure in cooperation with the first engaging structure to effect a substantially rigid affixing of the seat with a second side of the support structure opposite the first side to complete the converting.

It is, therefore, a feature of the present invention to provide a system, apparatus, and method for converting a removable seat from a vehicle to an independent seating unit.

Further features of the present invention will be apparent from the following specification and claims when considered in connection with the accompanying drawings, in which like elements are labeled using like reference numerals in the various figures, illustrating the preferred embodiments of the invention.

BRIEF DESCRIPTION OF THE DRAWINGS

FIG. 3 is a perspective view of a representative latch and post for use with the disclosed engaging arrangement.

FIG. 4 is a schematic plan view of a representative embodiment of an independent seating unit poised for assembly and configured according to a preferred embodiment of the present invention.

DETAILED DESCRIPTION OF THE PREFERRED EMBODIMENT

Figure 2:
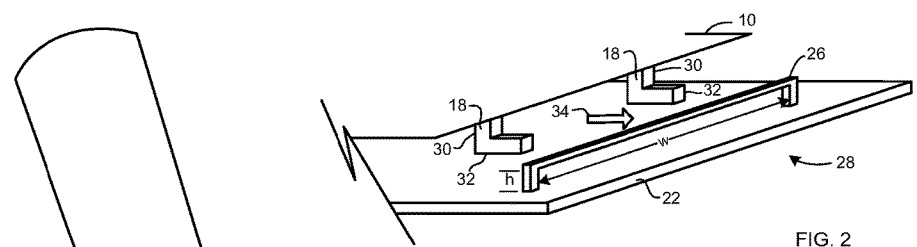
FIG. 2 is a perspective drawing of a detail portion of the illustration of FIG. 1.

The term "locus" is intended herein to indicate a place, location, locality, locale, point, position, site, spot, volume, juncture, junction or other identifiable location-related zone in one or more dimensions. A locus in a physical apparatus may include, by way of example and not by way of limitation, a corner, intersection, curve, line, area, plane, volume, point, pin or a portion of any of those features. A locus in a flow chart may include, by way of example and not by way of limitation, a juncture, step, site, function, query, response or other aspect, step, increment or an interstice between junctures, steps, sites, functions, queries, responses or other aspects of the flow or method represented by the chart.

In order to facilitate understanding the invention, like elements appearing in the various drawings will generally be referred to using like reference numerals.

Figure 1:
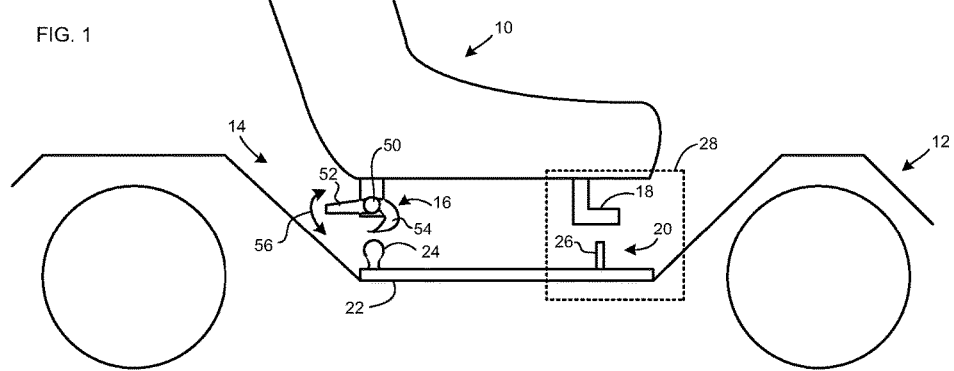
FIG. 1 is a schematic plan view of a removable seat poised for installation in a vehicle.

FIG. 1 is a schematic plan view of a removable seat poised for installation in a vehicle. FIG. 2 is a perspective drawing of a detail portion of the illustration of FIG. 1. In FIG. 1, a removable seat 10 is poised for installation in a vehicle 12. By way of example and not by way of limitation, vehicle 12 may be a Polaris Razr off-road side-by-side vehicle. Of course, the present invention may be employed in connection with any of the above-listed off-road side-by-side vehicles having a removable seat by providing an engaging structure appropriate for the respective vehicle model. Seat 10 includes a first engaging structure 14. First engaging structure 14 includes a latch 16 and an L-shaped catch element 18. Vehicle 12 has a second engaging structure 20. Second engaging structure 20 includes a support element 22 upon which are affixed a post 24 and a holding bar 26.

Latch 16 presents a pivot locus 50, a handle 52 and an engagement structure 54. Latch 16 may rotate about pivot locus 50 in response to force applied to handle 52, as indicated by arrow 56. Preferably latch 16 is biased, as by a spring for example (not shown, known to those skilled in the art of latch manufacture) toward a position engaging post 24. When latch 16 is biased toward engaging post 24, one may push on seat 10 when seat 10 is aligned for engagement with post 24 to effect moving seat 10 toward support element 22 with sufficient force to overcome the bias applied to latch 16 as latch 16 permits post 24 to pass and then responds to the provided bias to engage post 24 as seat 10 continues to be urged toward support element 22 to achieve an installed orientation.

Detail 28 of FIG. 1 is illustrated in FIG. 2 to lend further clarity to this disclosure. In FIG. 2, detail 28 illustrates that seat 10 presents two catch elements 18 in spaced relation from each other. Catch elements 18 are oriented with their respective vertical legs 30 attached with seat 10 and with their respective horizontal legs 32 extending from vertical legs 30 toward holding bar 26. Catch element 18 may be constructed as a single L-shaped element substantially spanning support element 22 or as two or more individual narrower elements 18, as illustrated in FIG. 2. Holding bar 26 presents a gap between holding bar 26 and support element 22 having a width w, and a height h. Thus, catch element 18 (be it a single element or a plurality of elements) must span horizontally less than width w, and horizontal leg 32 (or legs if more than one) must not measure greater than height h so that catch element 18 may slide under holding bar 26 in a direction indicated by arrow 34. Preferably, first engaging structure 14 and second engaging structure 20 are arranged so that when seat 10 is installed within vehicle 12, vertical legs 30 of catch elements 18 are substantially in contact with holding bar 26 and latch 16 firmly engages post 24.

Other engaging structures may be employed without departing from the scope of this disclosure. The present disclosure of an engaging arrangement is intended to be representative and is not exhaustive.

FIG. 3 is a perspective view of a representative latch and post for use with the disclosed engaging arrangement. In FIG. 3, a post 24 presents a neck portion 40 extending from support element 22. Neck portion 40 is generally cylindrical in sections parallel with support element 22 and has a diameter d1. Neck portion merges into a generally spherical head portion 42 at the end of neck portion 40 distal from support element 22. Head portion 42 has a diameter d2. Diameter d2 is greater than diameter d1.

Latch 16 presents a pivot locus 50, a handle 52 and an engagement structure 54. Latch 16 may rotate about pivot locus 50 in response to force applied to handle 52. Engagement structure 54 presents a receiving structure 60 distal from handle 52 so that rotation of latch 16 about pivot locus 50 in response to moving handle 52 results in movement by engagement structure 54. Receiving structure 60 presents a gap 62 for receiving post 24. Gap 62 is proportioned so that neck portion 40 of post 24 may be securely received within gap 62 and held within gap 62 in response to bias force applied to latch 16 when seat 10 is in an installed orientation.

That is, when installing seat 10 in vehicle 12, one may first slide catch elements 18 under holding bar 26, preferably until catch elements 18 bear against holding bar 26. Thereafter, one may push seat 10 toward support element 22. Pressing latch 16 against post 24 will overcome the bias force applied to latch 16 urging latch 16 toward its installed orientation with neck portion 40 captured within gap 62 by moving latch 16 about pivot locus 50 an amount sufficient to permit engagement structure 54 to pass head portion 42 of post 24. Continued pressing on seat 10 will further move latch 16 past head portion 42 until latch 16 begins to bear against the lesser diameter d1 of neck portion 40. The bias force on latch 16 then urges latch 16 toward a position at which engagement structure 54 receives neck portion 42 within gap 62 in an installed orientation and that orientation is maintained by the bias force applied to latch 16. Larger diameter d2 of head portion 42 cooperated with the bias force applied to latch 16 to resist seat 10 disengagement until an operator exercises latch 16 appropriately to remove seat 10 from vehicle 12.

FIG. 4 is a schematic plan view of a representative embodiment of an independent seating unit poised for assembly and configured according to a preferred embodiment of the present invention. In FIG. 4, a removable seat 10 is illustrated which is substantially identical with seat 10 illustrated in FIG. 1. In fact, an important feature of the present invention is that one may remove a seat 10 from a vehicle 12 and employ that very same seat 10 as an independent seating unit using the present invention. FIG. 4 illustrates a seat 10 poised for assembly with a converting structure to create an independent seating unit 132.

Thus, in FIG. 4, seat 10 includes a first engaging structure 14. First engaging structure 14 includes a latch 16 and an L-shaped catch element 18. Latch 16 presents a pivot locus 50, a handle 52 and an engagement structure 54. Latch 16 may rotate about pivot locus 50 in response to force applied to handle 52, as indicated by arrow 56. Preferably latch 16 is biased, as by a spring for example (not shown, known to those skilled in the art of latch manufacture) toward an engaging position, as described above in connection with FIG. 3.

Also appearing in FIG. 4 is a converting structure 119 for adapting seat 10 for use as an independent seating unit. Converting structure 119 presents a third engaging structure preferably embodied in a proxy second engaging structure 120.

For purposes of this disclosure the description of an element as being a "proxy" element is intended to indicate that the proxy element is substantially the same as an original of that element, may stand in for or substitute for the original element, and may operate in place of the original element. Thus, for example proxy second engaging structure 120 and its various proxy elements may substitute for second engaging structure 20 and its original elements in operation and other respects. Accordingly, proxy second engaging structure 120 includes a support element 122. Support element 122 includes a first side 123 and a second side 125. Upon second side 125 are affixed a post 124 and a holding bar 126. A plurality of legs 110 depend from first side 123 of support element 122. A plurality of legs such as, by way of example and not by way of limitation, four legs 110 may depend from proxy support element 122, for example. However only two legs 110 are visible in FIG. 4 because of the plan view nature of FIG. 4. Legs 110 may be attached with proxy support element 122 by any of several known attachment methods such as, by way of example and not by way of limitation, welding, nut and bolt, tab within slot or another attachment method. Details of such various known attachment methods are not illustrated.

First engaging structure 14 may cooperate with proxy second engaging structure 120 to achieve an installed orientation of seat 10 with converting structure 119 in substantially the same manner that first engaging structure 14 cooperates with second engaging structure 20 to achieve an installed orientation of seat 10 with vehicle 12 (see description above relating to FIGS. 1-3).

That is, when installing seat 10 with converting structure 119, one may first slide catch elements 18 under holding bar 26, preferably until catch elements 18 bear against holding bar 26. Thereafter, one may push seat 10 toward support element 22. Latch 16 is biased toward engaging post 124. One may push on seat 10 when seat 10 is aligned for engagement with post 124 to effect moving seat 10 toward support element 122 with sufficient force to overcome the bias applied to latch 16 as latch 16 permits post 124 to pass and then responds to the provided bias to engage post 124 as seat 10 continues to be urged toward support element 122 to achieve an installed orientation.

In such an installed orientation, legs 110 maintain seat 10 and its attached proxy support element 122 in spaced relation from a base 112 upon which an assembled seating unit may rest. Base 112 may be embodied in the ground, a patio, a platform or any other base upon which an independent seating unit may be employed.

While a third engaging structure is disclosed herein as a proxy engaging structure, such a construction is not required for purposes of practicing the present invention. Any third engaging structure that may interact with a first engaging structure on a seat 10 to effect a firm attachment between seat 10 and converting structure 119 will suffice, and is considered to be within the scope of the present invention.

Figure 5:
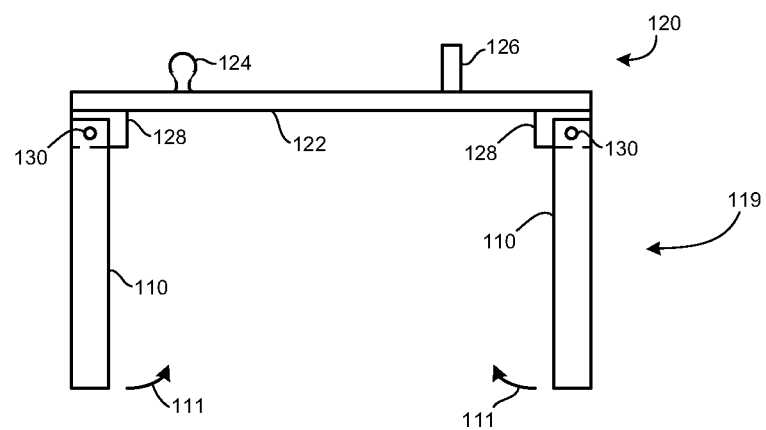
FIG. 5 is a schematic plan view of a support structure with foldable depending legs.

FIG. 5 is a schematic plan view of a support structure with foldable depending legs. In FIG. 5, a converting structure 119 includes a proxy support element 122 bearing a representative proxy second engagement structure 120 that includes a proxy post 124 and a proxy holding bar 126. Proxy support element 122 includes a plurality of extensions 128 from which legs 110 depend. Legs 110 are coupled with extensions 128 at a pivot locus 130. Pivot locus 130 may be constructed in any number of known rotating coupling methods including for example, but not limited to, a pin, a rivet, a post within an aperture, or another known structure for providing a pivot locus. In a preferred embodiment of converting structure 119 a stop structure will also be provided to arrest rotation of leg 110 about pivot locus 130 beyond a substantially perpendicular orientation with respect to proxy support element 122, as shown in FIG. 5. Such a substantially perpendicular orientation may be a preferred position for leg 110 in an installed orientation to facilitate use of converting unit 119 with an associated seat 10 as an independent seating unit. Such a stop structure will preferably also provide a locking structure for locking each leg 110 in its respective installed orientation to prevent unanticipated folding of a leg 110 from its respective installed orientation during use. Details of stop structures and associated locking structures are not illustrated here because such structures are not part of the present invention. Any known stop structures and locking structures may suffice for use with the present invention as described above. Legs 110 may be folded by urging each respective leg 110 in a direction indicated by a respective arrow 111 toward a position generally parallel with proxy support element 122 to facilitate storing converting structure 119. Such a capability to fold converting structure 119 would be especially useful if one were traveling to a location using an off-road side-by-side vehicle with removable seats. In such circumstances one could have a comfortable seat for around a campfire or other locale without having to carry bulky additional seating or the like because converting structure 119 with foldable legs takes up very little room. One could simply remove a seat 10 from the vehicle by which one traveled, unfold legs 110 of a converting structure 119, assemble the removed seat 10 with converting structure 119 and enjoy a comfortable independent seating unit.

Figure 6:
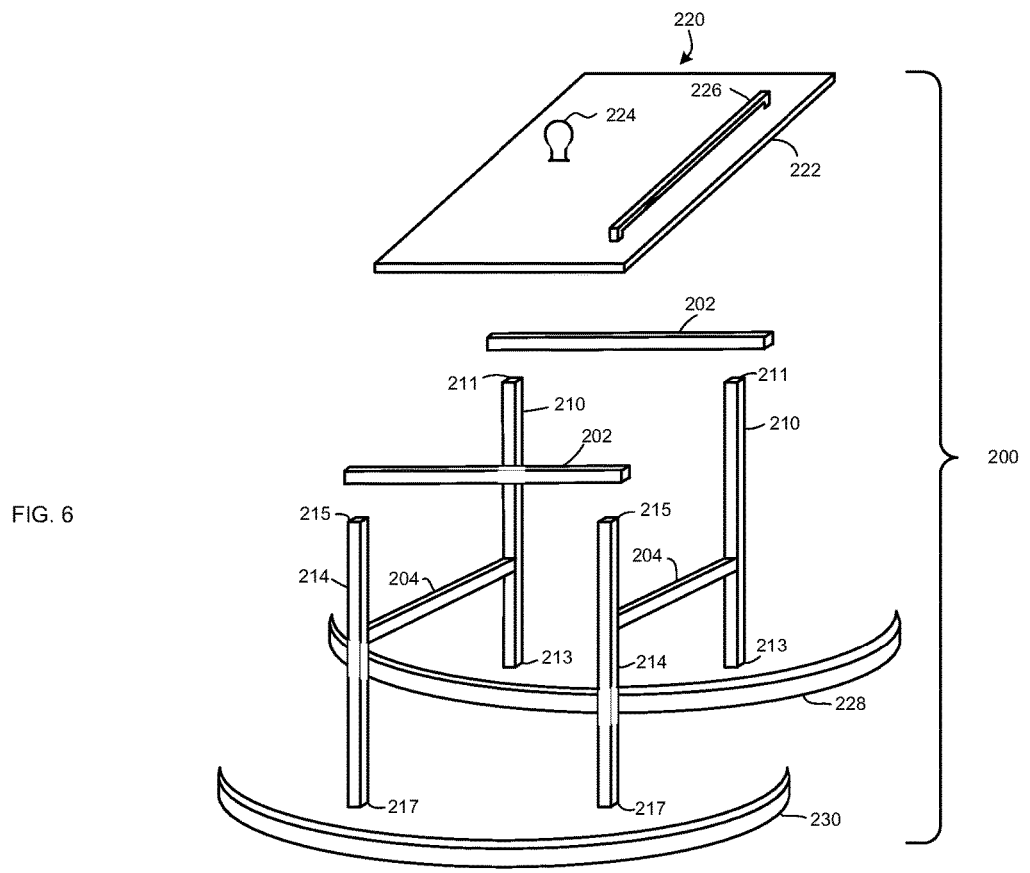
FIG. 6 is an exploded perspective view of an embodiment of the present invention having a rocking chair configuration.

FIG. 6 is an exploded perspective view of an embodiment of the present invention having a rocking chair configuration. In FIG. 6, a converting structure 200 includes a proxy support element 222 bearing a representative proxy second engagement structure 220 that includes a proxy post 224 and a proxy holding bar 226. First leg braces 202 couple legs 210 together at their tops 211 and couple legs 214 together at their tops 215. Second leg braces 204 couple each leg 210 with a respective leg 214 generally midway between tops 211, 215 of legs 210, 214 and bottoms 213, 217 of legs 210, 214. Arcuate rail structure 228 is affixed with legs 210 and arcuate rail structure 230 is affixed with legs 214 to establish converting structure 200 in a rocking chair configuration. In a preferred embodiment, when converting structure 200 is assembled proxy support element 222 cooperates with first leg braces 202, second leg braces 204, legs 210, 214 and arcuate rail structures 228, 230 to establish converting structure 200 generally as a rigid right parallelepiped structure.

Figure 7:
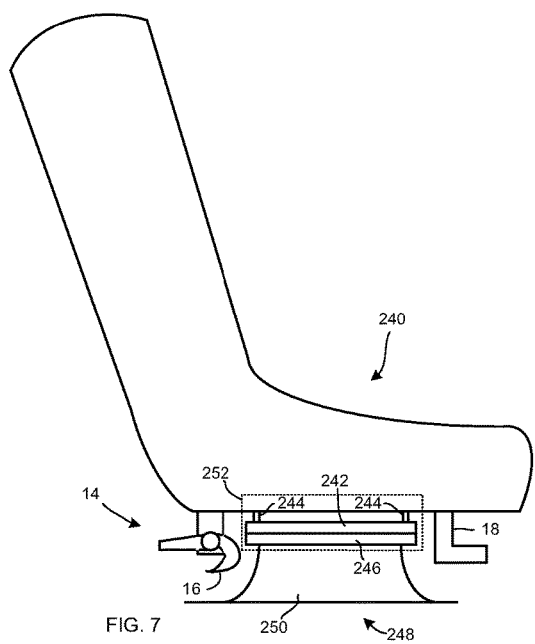
FIG. 7 is a schematic plan view of an alternate embodiment of the present invention.

FIG. 7 is a schematic plan view of an alternate embodiment of the present invention. In FIG. 7, a seat 240 includes a first engaging structure 14. First engaging structure 14 includes a latch 16 and an L-shaped catch element 18 generally as described above in connection with FIG. 1. In addition to first engaging structure 14 seat 240 has a mounting bar 242 attached with seat 240 by mounting posts 244. Not visible in this plan view, a similar mounting bar 242 is affixed with seat 240 on each side of seat 240, thereby presenting two substantially similar mounting bars 242 beneath seat 240. Mounting bars 242 may be installed instead of first engaging structure 14.

Figure 8:
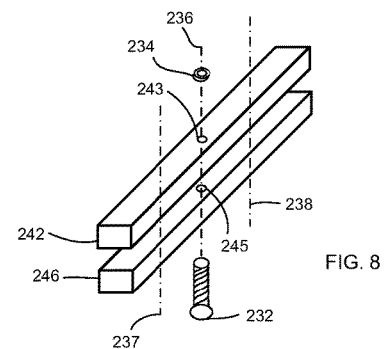
FIG. 8 is a schematic perspective view of a first alternate attachment arrangement appropriate for use with the second embodiment of the invention illustrated in FIG. 5.
Figure 9:
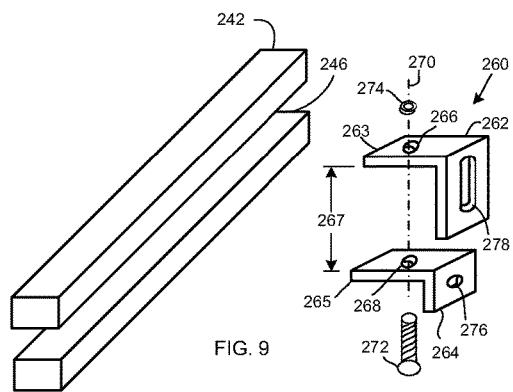
FIG. 9 is a schematic perspective view of a second alternate attachment arrangement appropriate for use with the second embodiment of the invention illustrated in FIG. 5.

A converting structure 248 is schematically represented by a pedestal 250 supporting a receiving structure 246. Receiving structure 248 may be embodied in a plate, a bar or another structure capable of cooperating with mounting bars 242 as will be described in connection with FIGS. 8 and 9. Box 252 indicates the elements of this alternate embodiment of the present invention that are illustrated in FIGS. 8 and 9. In order to simplify this disclosure, receiving structure 246 is illustrated in FIGS. 8 and 9 as a bar structure, keeping in mind that other structures capable of interacting with mounting bars 242 in manners appropriate to effect the desired final assembly are intended as being within the scope of the present invention.

FIG. 8 is a schematic perspective view of a first alternate attachment arrangement appropriate for use with the second embodiment of the invention illustrated in FIG. 7. In FIG. 8, bars 242, 244 are illustrated in spaced relation poised for attachment in an abutting relationship to couple seat 248 with converting structure 248, as illustrated in FIG. 7. An aperture 243 is provided through bar 242. An aperture 245 is provided through bar 244. A bolt 232 may be passed through aperture 243, 245 generally along an axis 236 and bars 242, 244 may be clamped together in a secure abutting relationship by tightening a cooperating nut 234. It may be preferred that a plurality of bolts 232 be employed to effect the desired clamping, as indicated by additional axes 237, 238.

FIG. 9 is a schematic perspective view of a second alternate attachment arrangement appropriate for use with the second embodiment of the invention illustrated in FIG. 7. In FIG. 9, bars 242, 244 are illustrated in spaced relation poised for attachment in an abutting relationship to couple seat 248 with converting structure 248, as illustrated in FIG. 7. A clamp 260 includes a first clamping element 262 presenting a first jaw 263 and a second clamping element 264 presenting a second jaw 265. An aperture 266 through first jaw 263 and an aperture 268 through second jaw 265 may align substantially along an axis 270 to facilitate insertion of a bolt 272 through apertures 266, 268. Jaws 263, 265 may be tightened to establish a secure clamping of bars 242, 246 together in a secure abutting relationship by tightening a cooperating nut 274. An additional bolt and nut may cooperate with an aperture 264 and a slot 278 to adjust a gap 267 between jaws 263, 265, or to provide additional clamping force upon bars 242, 246, or to adjust gap 267 and provide additional clamping force. It may be preferred that a plurality of clamps be employed for securing bars 242, 246 (not shown in FIG. 9; understood by those skilled in the clamping assembly arts).

Other clamp structures may also be contemplated by those skilled in the clamping assembly arts including, but not limited to, over-center locking clamps, and other types of clamps.

Figure 10:
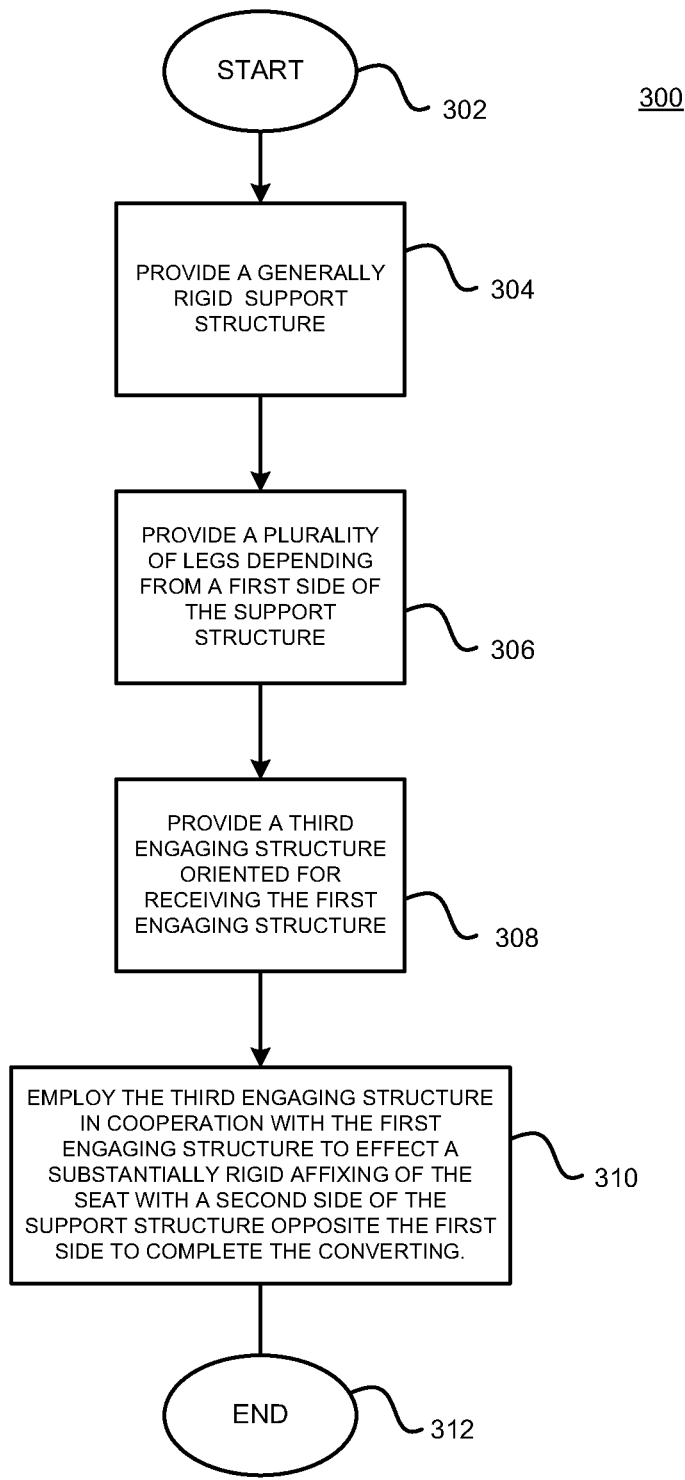
FIG. 10 is a flow chart illustrating the method of the present invention.

FIG. 10 is a flow chart illustrating the method of the present invention. In FIG. 10, a method 300 is illustrated for converting a removable seat from a vehicle to an independent seating unit. The removable seat has a first engaging structure associated with the seat. The vehicle has a second engaging structure associated with the vehicle. The first engaging structure cooperates with the second engaging structure to affix the seat with the vehicle. The method begins at a START locus 302. Method 300 continues with providing a generally rigid support structure, as indicated by a block 304. Method 300 continues with providing a plurality of legs depending from a first side of the support structure, as indicated by a block 306. Method 300 continues with providing a third engaging structure oriented for receiving the first engaging structure, as indicated by a block 308. Method 300 continues with employing the third engaging structure in cooperation with the first engaging structure to effect a substantially rigid affixing of the seat with a second side of the support structure opposite the first side to complete the converting, as indicated by a block 310. Method 300 terminates at an END locus 312.

It is to be understood that, while the detailed drawings and specific examples given describe preferred embodiments of the invention, they are for the purpose of illustration only, that the apparatus and method of the invention are not limited to the precise details and conditions disclosed and that various changes may be made therein without departing from the spirit of the invention which is defined by the following claims.

I claim:

1. A system for converting a removable seat from a vehicle to an independent seating unit; said removable seat having a first engaging structure associated with said seat; said vehicle having a second engaging structure associated with said vehicle; said first engaging structure cooperating with said second engaging structure to affix said seat with said vehicle; the system comprising:
   (a) a generally rigid support structure;
   (b) a plurality of legs depending from a first side of said support structure; and
   (c) a third engaging structure oriented for receiving said first engaging structure; said third engaging structure cooperating with said seat to effect a substantially rigid affixing of said seat with a second side of said support structure opposite said first side to complete said converting; said third engaging structure being configured to cooperate with said first engaging structure to complete said converting in a manner substantially similar to cooperation of said second engaging structure with said first engaging structure to affix said seat with said vehicle; the system further comprising arcuate rails selectively affixed with said plurality of legs to establish said independent seating unit with a rocking chair configuration.

2. The system for converting a removable seat from a vehicle to an independent seating unit as recited in claim 1 wherein said plurality of legs are rotatably depending from said support structure to permit folding of each leg of said plurality of legs to facilitate storing the system.

3. A system for converting a removable seat from a vehicle to an independent seating unit; said removable seat having a first engaging structure associated with said seat; said vehicle having a second engaging structure associated with said vehicle; said first engaging structure cooperating with said second engaging structure to affix said seat with said vehicle; the system comprising:
 (a) a generally rigid support structure;
 (b) a plurality of legs depending from a first side of said support structure; and
 (c) a third engaging structure oriented for receiving said first engaging structure; said third engaging structure cooperating with said seat to effect a substantially rigid affixing of said seat with a second side of said support structure opposite said first side to complete said converting; said third engaging structure being a plurality of bolts traversing said seat and said support structure with cooperating nuts securing said plurality of bolts in place; the system further comprising arcuate rails selectively affixed with said plurality of legs to establish said independent seating unit with a rocking chair configuration.

4. The system for converting a removable seat from a vehicle to an independent seating unit as recited in claim 3 wherein said plurality of legs are rotatably depending from said support structure to permit folding of each leg of said plurality of legs to facilitate storing the system.

5. A system for converting a removable seat from a vehicle to an independent seating unit; said removable seat having a first engaging structure associated with said seat; said vehicle having a second engaging structure associated with said vehicle; said first engaging structure cooperating with said second engaging structure to affix said seat with said vehicle; the system comprising:
 (a) a generally rigid support;
 (b) a plurality of legs depending from a first side of said support structure; and
 (c) a third engaging structure oriented for receiving said first engaging structure; said third engaging structure cooperating with said seat to effect a substantially rigid affixing of said seat with a second side of said support structure opposite said first side to complete said converting; said third engaging structure being a plurality of clamps configured for clampingly engaging said seat and said support structure; the system further comprising arcuate rails selectively affixed with said plurality of legs to establish said independent seating unit with a rocking chair configuration.

6. The system for converting a removable seat from a vehicle to an independent seating unit as recited in claim 5 wherein said plurality of legs are rotatably depending from said support structure to permit folding of each leg of said plurality of legs to facilitate storing the system.

7. An apparatus for adapting a seat removable from a vehicle for use as an independent seating unit; said seat being configured for installation in said vehicle using complementary first and second engaging structures respectively included in said seat and said vehicle; said first and second engaging structures cooperating to affix said seat within said vehicle in an installed orientation; the apparatus comprising:
 (a) a generally horizontal first member;
 (b) at least one generally vertical second member depending from said first member; said at least one second member maintaining said first member in spaced relation from a base upon which said seating unit rests in said installed orientation; and
 (c) a third engaging structure configured for cooperating with one of said complementary first and second engaging structures to affix said seat with the apparatus in said installed orientation; said third engaging structure being configured to cooperate with said first engaging structure to complete said converting in a manner substantially similar to cooperation of said second engaging structure with said first engaging structure to affix said seat with said vehicle; the apparatus further comprising arcuate rails selectively affixed with said at least one second member to establish said independent seating unit with a rocking chair configuration.

8. The apparatus for adapting a seat removable from a vehicle for use as an independent seating unit as recited in claim 7 wherein said at least one second member comprises a plurality of legs rotatably depending from said support structure to permit folding of each leg of said plurality of legs to facilitate storing the apparatus.

9. A method for converting a removable seat from a vehicle to an independent seating unit; said removable seat having a first engaging structure associated with said seat; said vehicle having a second engaging structure associated with said vehicle; said first engaging structure cooperating with said second engaging structure to affix said seat with said vehicle; the method comprising:
 (a) providing a generally rigid support structure;
 (b) providing a plurality of legs depending from a first side of said support structure;
 (c) providing a third engaging structure oriented for receiving said first engaging structure; and
 (d) employing said third engaging structure in cooperation with said first engaging structure to effect a substantially rigid affixing of said seat with a second side of said support structure opposite said first side to complete said converting;
 said third engaging structure being configured to cooperate with said first engaging structure to complete said converting in a manner substantially similar to cooperation of said second engaging structure with said first engaging structure to affix said seat with said vehicle; said plurality of legs including arcuate rails that establish said independent seating unit with a rocking chair configuration.

10. The method for converting a removable seat from a vehicle to an independent seating unit as recited in claim 9 wherein said plurality of legs are rotatably depending from said support structure to permit folding of each leg of said plurality of legs to facilitate storing said support structure with said plurality of legs.

\* \* \* \* \*